Patented Mar. 11, 1952

2,588,948

UNITED STATES PATENT OFFICE 2,588,948

DELAYED ACTION COAGULANT AND METHOD OF COAGULATING ACID-COAGULABLE LATEX

Jerome C. Westfahl, Cuyahoga Falls, Ohio, assignor to The B. F. Goodrich Company, New York, N. Y., a corporation of New York No Drawing. Application April 2, 1947, Serial No. 738,945

16 Claims. (Cl. 260—821)

This invention relates to the coagulation of a latex and a coagulant composition therefor and is particularly concerned with delayed coagulation of an aqueous dispersion of natural or synthetic rubber by the admixture with said dispersion of a delayed action coagulant composition.

Latex is ordinarily coagulated by means of an instantaneous coagulant such as a water-soluble acid or a water-soluble polyvalent metal salt. In many instances, however, it is desirable to disperse the coagulant for the latex in the latex dispersion without effecting immediate coagulation. For this purpose, a so-called delayed action coagulant is necessary which undergoes a measurable induction period before effecting coagulation. Delayed action coagulation is particularly desirable in the manufacture of "foamed" sponge rubber articles wherein the rubber latex is brought into a semi-stable foamed condition by whipping air into the latex or by incorporating a gas-forming material in the latex. This semi-stable foam is then coagulated, before the foam collapses, to give a cellular product. Instantaneous coagulants obviously cannot be incorporated into the latex before foaming; and if sprayed on the semi-stable foam, they must effect coagulation by slow diffusion through the foam which results in a non-uniform product.

It is desirable, therefore, to provide a coagulant composition which can be thoroughly mixed with a latex without effecting coagulation of the latex; and which thereafter completely coagulates the latex after a lapse of a measurable time interval. In addition, the composition must be capable of being mixed into a foam latex without causing the foam to collapse.

I have discovered that a suitable delayed action coagulant composition for a latex and particularly for a foamed rubber latex comprises a water-soluble peroxide and an alpha-diketone.

The alpha-diketone is mixed into a latex either as the pure compound or in solution in water or other suitable solvent which is miscible with water. The diketone does not coagulate the latex, nor does it cause the latex foam to collapse. A water-soluble peroxide, preferably hydrogen peroxide, is then also mixed into the latex with coagulation of the latex taking place after the lapse of a measurable time interval. For example, diacetyl and hydrogen peroxide may be thoroughly mixed into a natural rubber latex without effecting immediate coagulation. After a lapse of 3 to 6 minutes, however, the latex will be completely coagulated with the coagulation being rapidly effected after an initial induction period during which time the latex remains substantially uncoagulated. The order of mixing may be varied as desired. Thus, the peroxide may be added to the latex before the addition of the alpha-diketone or they may be added simultaneously.

The particular alpha-diketone to be used in practising this invention is largely a matter of choice. Any alpha-diketone may be used having the structure

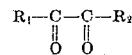

where $R_1$ and $R_2$ are either aliphatic or aromatic radicals; and of these compounds the water-soluble dialkyl diketones are particularly suitable, although diaryl alpha-diketones or mixed alkyl aryl alpha-diketones may be used. For example, typical compounds used in practising this invention include diacetyl; 3, 4-hexanedione; phenyl methyl diketone; diphenyl diketone; methyl ethyl diketone; dibutyl diketone, and similar alpha-diketones.

Hydrogen peroxide is preferably used in conjunction with the alpha-diketones because of the relative stability of the aqueous solution thereof, but any suitable water-soluable peroxide may be used as, for example, sodium peroxide, potassium peroxide or strontium peroxide.

The coagulant composition herein described may be used to coagulate any rubber latex whether a natural or synthetic rubber latex, or may be used to coagulate other latices containing dispersed polymeric organic compounds as, for example, vinyl resin latices, etc. The latex is preferably stabilized against salt flocculation by the addition of a suitable protective colloid such as methyl cellulose, gelatin or a similar stabilizing agent, and may also contain the commonly employed compoundnig ingredients for latex, such as fillers, reinforcing pigments, vulcanization agents and accelerators therefor, emulsifying agents, etc.

The alpha-diketone is preferably added to the latex as a solution although the pure diketone may be added directly if it is desired to minimize dilution of the latex dispersion. The weight of the diketone used is preferably from 0.1% to 5% of the weight of the rubber in the latex to be coagulated although greater or lesser amounts may be used depending on the pH of the latex dispersion and the particular latex composition to be coagulated.

The peroxide is preferably added as an aqueous solution and the commercially available 30% hydrogen peroxide solution is particularly suitable. The peroxide is preferably added in an amount approximately equal to the weight of the added alpha-diketone although amounts of peroxide as low as 25% of the weight of diketone or lower may be used or an excess of the peroxide up to 2 to 3 times the weight of diketone or higher may be used.

The use of a coagulant composition embodying this invention is best illustrated by a typical example which is included merely for purposes of illustration and is not intended to limit the scope of the invention.

*Example I.*

50 gm. Hevea latex (60% T. S.)
5 ml. 5% methyl cellulose solution
2 ml. 50% zinc oxide dispersion
3 ml. 15% diacetyl solution
2 ml. 30% hydrogen peroxide solution All of the above solutions and dispersions are in aqueous media. The latex, methyl cellulose and zinc oxide are thoroughly mixed and the diacetyl is dispersed in the resulting dispersion. The hydrogen peroxide is then stirred into the latex. Complete coagulation of the latex is effected in 3 minutes after the addition of the peroxide. Similar results are obtained using other alpha-diketones, other water-soluble peroxides and other latex compositions.

It will be understood that various materials may be used and the proportions thereof may be varied within the scope of this invention as defined in the appended claims.

I claim:

1. A delayed action coagulant composition for an aqueous dispersion of a rubber material comprising hydrogen peroxide and an alpha-diketone having the structure $$R_1-\underset{\underset{O}{\|}}{C}-\underset{\underset{O}{\|}}{C}-R_2$$

where $R_1$ and $R_2$ are hydrocarbon groups each containing a maximum of six carbon atoms, the weight of said peroxide being from one-fourth to three times the weight of said diketone.

2. A delayed action coagulant composition for an acid-coagulable rubber latex comprising a water-soluble dialkyl-diketone and hydrogen peroxide in an amount of from ¼ to 3 times the weight of said diketone.

3. A delayed action coagulant composition for an acid-coagulable aqueous dispersion of rubber material comprising diacetyl and hydrogen peroxide in an amount of from ¼ to 3 times the weight of said diacetyl.

4. The method of coagulating an acid-coagulable aqueous dispersion of rubber material which comprises dispersing therein 0.1–5% by weight based on the weight of rubber material in said dispersion of an alpha-diketone having the composition $$R_1-\underset{\underset{O}{\|}}{C}-\underset{\underset{O}{\|}}{C}-R_2$$

where $R_1$ and $R_2$ are hydrocarbon groups each containing a maximum of six carbon atoms, and hydrogen peroxide in an amount of ¼ to 3 times the weight of said alpha-diketone.

5. The method of coagulating an acid-coagulable rubber latex which comprises dispersing therein a water-soluble dialkyl-diketone in an amount equal to 0.1-5.0% by weight based on the weight of rubber in said latex, and hydrogen peroxide in an amount of one-fourth to three times the weight of said diketone.

6. The method of coagulating an acid-coagulable rubber latex which comprises dispersing in said latex 0.1–5.0% by weight of diacetyl based on the weight of rubber in said latex and hydrogen peroxide in an amount of ¼ to 3 times the weight of said diacetyl.

7. In combination with an acid-coagulable aqueous dispersion of rubber material, 0.1–5.0% by weight based on the weight of rubber material in said dispersion of an alpha-diketone having the composition $$R_1-\underset{\underset{O}{\|}}{C}-\underset{\underset{O}{\|}}{C}-R_2$$

where $R_1$ and $R_2$ are hydrocarbon groups each containing a maximum of six carbon atoms, and hydrogen peroxide in an amount of ¼ to 3 times the weight of said alpha-diketone.

8. In combination with an acid-coagulable rubber latex, 0.1–5.0% by weight of a water-soluble dialkyl diketone based on the weight of rubber in said latex and hydrogen peroxide in an amount of ¼ to 3 times the weight of said dialkyl-diketone.

9. The composition of claim 1 in which the weight of peroxide is substantially equal to the weight of the diketone.

10. The composition of claim 2 in which the weight of peroxide is substantially equal to the weight of the diketone.

11. The composition of claim 3 in which the weight of peroxide is substantially equal to the weight of the diketone.

12. The method of claim 4 in which the weight of peroxide is substantially equal to the weight of the diketone.

13. The method of claim 5 in which the weight of peroxide is substantially equal to the weight of the diketone.

14. The method of claim 6 in which the weight of peroxide is substantially equal to the weight of the diketone.

15. The method of coagulating Hevea latex which comprises dispersing therein 0.1 to 5% by weight of the rubber in said latex of an alpha-diketone having the composition $$R_1-\underset{\underset{O}{\|}}{C}-\underset{\underset{O}{\|}}{C}-R_2$$

where $R_1$ and $R_2$ are hydrocarbon groups each containing a maximum of six carbon atoms, and hydrogen peroxide in an amount of ¼ to 3 times the weight of said diketone.

16. In combination with Hevea latex, 0.1 to 5.0% by weight based on the weight of the rubber in said latex of an alpha-diketone having the composition $$R_1-\underset{\underset{O}{\|}}{C}-\underset{\underset{O}{\|}}{C}-R_2$$

where $R_1$ and $R_2$ are hydrocarbon groups each containing a maximum of six carbon atoms, and hydrogen peroxide in an amount of ¼ to 3 times the weight of said diketone.

JEROME C. WESTFAHL.

REFERENCES CITED

The following references are of record in the file of this patent:

UNITED STATES PATENTS

| Number | Name | Date |
|---|---|---|
| 1,838,826 | Gunther et al. | Dec. 29, 1931 |
| 1,981,184 | McGavack | Nov. 20, 1934 |
| 1,996,090 | Wilson | Apr. 2, 1935 |
| 2,414,610 | Romick | Jan. 21, 1947 |